United States Patent [19]
Miyasaka

[11] Patent Number: 5,592,840
[45] Date of Patent: Jan. 14, 1997

[54] METHOD OF PREVENTING ABRASION AT SLIDING PORTION OF METAL-PRODUCT

[75] Inventor: Yoshio Miyasaka, Kasugai, Japan

[73] Assignee: Fuji Kihan Co., Ltd., Aichi, Japan

[21] Appl. No.: 408,293

[22] Filed: Mar. 22, 1995

[51] Int. Cl.$^6$ ............................. C21D 7/06; C21D 8/00
[52] U.S. Cl. ................................................ 72/53; 29/90.7
[58] Field of Search .................................. 72/53; 29/90.7

[56] References Cited

U.S. PATENT DOCUMENTS

| | | | |
|---|---|---|---|
| 4,258,084 | 3/1981 | Hayden, Sr. | 72/53 |
| 4,581,913 | 4/1986 | Reed | 72/53 |
| 5,297,338 | 3/1994 | Ishida et al. | 29/893.2 |
| 5,302,218 | 4/1994 | Shirai et al. | 72/53 |

FOREIGN PATENT DOCUMENTS

| | | | |
|---|---|---|---|
| 3104520 | 9/1978 | Japan | 72/53 |
| 51-40643 | 6/1993 | Japan | 72/53 |
| 60-41631 | 2/1994 | Japan | 72/53 |
| 258409 | 12/1995 | Japan | 72/53 |

OTHER PUBLICATIONS

English Abstract, JP 5-186822, filed 27 Jul. 1993.
English Abstract, JP 2-254144, filed 12 Oct. 1990.
English Abstract, JP 5-78859, filed 30 Mar. 1993.
English Abstract, JP 5-33047, filed 9 Feb. 1993.

*Primary Examiner*—David Jones
*Attorney, Agent, or Firm*—Millen, White, Zelano & Branigan, P.C.

[57] ABSTRACT

By shot-peening, shots having almost spherical shape are impacted against a surface of a portion of a metal-product, the portion being one which is to be subjected to sliding action. The shots have a hardness higher than that of the metal-product. By the shot-peening, the surface of the metal-product is heated to a temperature higher than a predetermined temperature and very small concave portions, each having a circular arc-shaped cross section, are formed due to the impact of the shots. As a result, the structure of the surface layer of the sliding portion has high internal stress, high hardness and high toughness. Further, since very small concave portions are formed on the surface of the sliding portion, the surface tension of lubricating oil is not decreased and a stable oil film can be formed. In addition, the surface retains high hardness and toughness, even if sliding is performed for long time periods, and the concave portions are not deformed so that a stable oil film can be maintained.

26 Claims, 3 Drawing Sheets

X 100

X 500

METHOD OF PREVENTING ABRASION AT SLIDING PORTION OF METAL-PRODUCT

BACKGROUND OF THE INVENTION

1. Field of the Invention

This invention relates to a method for improving abrasion resistance at the sliding portion of a metal-product such as a machine part by: changing the metallic structure of the surface of the sliding portion; providing the surface of the sliding portion with a predetermined roughness; and forming sumps for oil to provide an oil film which is seldom broken. In the inventive method, a shot-peening process is performed on the surface of the sliding portion.

2. Description of the Prior Art

Conventionally, in order to prevent abrasion of the surface of the sliding portion of a metal-product, the hardness of the material of the metal-product was increased with a heat process such as hardening, carburization and nitriding. Alternatively, roughness of the surface of the metal-product was increased by machine work such as cutting, grinding and polishing with a machine tool such as a lathe and fraise.

Moreover, an oil film was formed at the sliding portion of the metal-product by means of an oil feed process, such as an oil bath process, splash process, drop process, cycling process or spray process, for preventing abrasion at the sliding portion. In these oil feeding processes, a method for effectively forming the oil film on the surface of the sliding portion of the metal-product and a method for improving quality of a lubricating oil for preventing the oil film from being broken have been developed.

Further, concave portions were formed on the surface of the sliding portion of the metal-product by means of scraping, cross polishing and the like, to form oil sumps. In scraping the surface of the sliding portion of the metal-product is chipped by scraping such as by spring scraping, plane scraping and cant scraping. On the other hand, cross polishing is a polishing method by which the surface of the metal-product is polished by cross-honing at high delivery speed using a honing machine. Cross polishing is used for polishing the internal surface of a cylinder in an engine.

In the conventional method for preventing abrasion on the surface of the sliding portion of the metal-product, in order to obtain further effective abrasion resistance, some of the above methods were combined. For example, roughness of the surface of the sliding portion of a metal-product was increased, hardness of the surface was increased by means of a heat process and an oil film was formed at the sliding portion by means of several kinds of oil feeding process.

However, the following problems remain in the above conventional methods for preventing abrasion on the surface of the sliding portion of a metal-product.

(1) When the surface of the sliding portion of the metal-product is hardened by means of the heat process, a strain appears in the metal-product. This causes a problem in that it takes much time to correct the form of the metal product. In some cases, the resultant metal-product may be inferior, having a form which can not be corrected.

In a metal-product, when the surface of its metal base or of its sliding portion is hardened by means of the heat process such as hardening, carburization and nitriding, the metal-product is lowered in toughness to become brittle. This causes a problem in that pitching occurs. For example, if the metal-product is a gear, pitching occurs at the corner of the end of each gear-tooth, i.e., the sliding portion of the gear.

(2) The above mentioned oil feeding methods cause problems in that apparatus for feeding the oil are complicated resulting in high costs.

(3) In the method for forming the oil sumps on the surface of the sliding portion of the metal-product by means of scraping, when the surface of the metal-product is too hard, it is difficult to perform the scraping. Thus, the heat process for increasing the hardness of the surface of the metal-product can not be perfectly carried out. Therefore, the abrasion resistance can not be improved sufficiently. Accordingly, when the sliding portion of the metal-product is subjected to sliding for a long time, the oil sumps formed on the sliding portion tend to become abraded or deformed. This causes a problem in that the oil film becomes broken. Further, under some abrasion-conditions at the sliding portion, the sliding portion needs adjustment or the metal-product itself needs replacement.

Since a large number of oil sumps can not be formed by means of scraping, the oil film becomes broken when the metal-product is subjected to sliding for a long time. Thus, the lubricating oil must be replaced or supplied periodically.

(4) On the surface subjected to machine work such as cutting, grinding and polishing, the cross sectional shape of the rough portion formed has an indented pattern with acute angles. Then, when the surface is subjected to sliding while lubricating oil is supplied thereto, the lubricating oil flows, due to capillary phenomenon, to the acute angled tip end of each concave portion in the rough-surface by a bearing pressure generated by sliding. This causes a problem in that the film becomes broken. The same problem is caused when the surface is cross polished.

SUMMARY OF THE INVENTION

The present invention has been developed for solving the above problems. The object of the present invention is to provide a method for preventing abrasion at a sliding portion of a metal-product by forming on the surface of the sliding portion numberless concave oil sumps, each sump having a very small circular arc-shaped cross section, and by changing a structure near the surface of the sliding portion of the metal-product to be a minuted metal structure having high hardness and toughness by means of a shot-peening process. The present invention is based on knowledge that shots projected against the surface of the metal-product by means of the shot-peening process produce heat on the surface of the metal-product and the temperature of the surface of the metal-product rises as the velocity of the shots increases.

To achieve the above objective, the method of the present invention for preventing abrasion at the sliding portion of the metal-product is characterized by a shot-peening process. In the shot-peening process, metal-product is heated near its surface to a temperature which is the same or higher than (a) the $A_3$ transformation temperature of the metal, in cases where the metal-product is made of a ferrous metal, or (b) to a temperature which is the same or higher than the recrystallization temperature of the metal in cases where the metal-product is made of a nonferrous metal. Also, concave oil sumps, each having a very small circular arc-shaped cross section, are formed on the surface of the sliding portion. In this shot-peening process, the shots have a hardness which is the same as or greater than that of the metal-product, an almost spherical shape, and a size of 20 to 200μ. The shots are projected at a velocity of 50 m/sec or higher.

It is favorable for the shots to have a velocity of 100 to 200 m/sec and a projection pressure of 3 to 6 kg/cm². At such velocity and pressure, the surface of the sliding portion of the metal-product can be surely heated to a temperature which is the same as or higher than the $A_3$ transformation temperature or recrystallization temperature. It is favorable for the size of each shot to be 28 to 125µ, for the diameter of a nozzle for projecting the shots to be 5 to 9 mm, and for the distance through which the shots are projected to be 150 to 200 mm since a high projection velocity can be obtained and the resultant oil sumps have a favorable shape, size and roughness. Further, in this case, the projection density is increased and very small oil sumps can be surely formed on the surface of the sliding portion of the metal-product.

At the sliding portion of the metal-product, the above shot-peening process can be carried out for a surface which is subjected to sliding wherein it contacts another surface. However, it is favorable that the shot-peening process is performed on both of these surfaces.

A lubricating oil is supplied to the surface of the sliding portion of the metal product, so that the oil film can be formed on the surface of the sliding portion of the metal-product. Thus, the abrasion at the sliding portion of the metal-product can be prevented.

By forming the shape of each shot to be closer to an accurate sphere, the shot-peening process can be performed further effectively. The material of the particle can be metal, ceramic or glass, having a hardness which is the same as or larger than that of the metal-product. For example, steal beads, glass beads of alumina-silica beads, which are harder than the glass beads, can be used as the shots.

It is favorable for each concave portion to have a substantially circular top shape with a diameter of 0.1 to 5µ. Further, the surface of the sliding portion of the metal-product can be roughened by the impact of the shots, for example surface to have the concave portions each having a size of 0.1µ or larger.

As explained after, when the shape of each shot is an accurate sphere, each concave portion formed on the surface of the sliding portion will have a suitable circular arc-shaped cross section and the effectiveness of the present invention will thereby be enhanced. However, when the shape of each shot is not spherical, the internal surface of each concave portion is not smooth for example, V-shaped notches are formed on the internal surface of the concave portion. In this case, the surface tension of the lubricating oil is small and the resultant effect is decreased to some extent.

The above shot-peening process is preferably performed 2 or more times on the sliding portion of the metal-product. In this case, the second and subsequent shot-peening processes are preferably carried out at higher pressures and the shots are projected over shorter distances in comparison to the first shot-peening process to provide the surface of the sliding portion of the metal-product with suitable roughness, to accurately form the numerous oil sumps with preferred shapes, and to heat the surface of the sliding portion of the metal-product to a temperature which is the same as or higher than the $A_3$ transformation temperature or recrystallization temperature. In the second and subsequent shot-peening processes, alumina-silica beads are preferably used since they have extremely large hardness.

By the impact force of the shots, the surface of the metal-product is heated to a temperature which is the same as or higher than the $A_3$ transformation temperature of the metal, in cases where the metal-product is made of iron-carbon steel such as carbon steel, or to a temperature which is the same as or higher than the recrystallization temperature of the metal, in cases where the metal-product is made of a nonferrous metal such as aluminum or copper alloy. Thus, the metallic structure of the surface layer is softened so that very small concave portions having small circular-arc shaped cross sections are formed on the surface of the sliding portion due to the impact force of each shot, the shots having the shape of substantially an accurate sphere. Further, the structure of the surface layer at the sliding portion is minuted thereby increasing the internal stress so that the structure can have high hardness and toughness. Before the shot-peening process, the surface of the sliding portion of the metal-product is provided with concave portions each having a V-shaped cross section. However, the above shot-peening process changes the shape of each concave portion from V-shape to a circular-arc shape cross section.

Accordingly, when the lubricating oil is supplied to the surface of the sliding portion of the metal-product, the lubricating oil forms oil droplets in the concave portions each having circular-arc shaped cross sections due to the surface tension of the lubricating oil. Further, since the numberless of very small concave portions each having the circular-arc shaped cross section can be accurately formed, each oil droplet is formed so as to correspond to the size of each concave portion. Also, the oil droplets which are adjacent each other and formed in the concave portions respectively can be connected resulting in the formation of stable oil sumps on the whole of the surface of the sliding portion. Then, when the sliding portion of the metal-product undergoes sliding and the bearing pressure is applied there in the same way as normal use of the metal-product, the surface tension of each oil droplet is maintained and the oil film is not broken during sliding for long time periods so that abrasion of the sliding portion of the metal-product can be prevented.

Further, the metallic structure of the surface layer of the sliding portion of the metal-product is formed so as to be minuted and have high internal stress, hardness and toughness. Thus, even if the metal-product is subjected to sliding for long time periods, the shape of each concave portion is not changed. Therefore, the oil film is stable and seldom broken so that abrasion of the sliding portion of the metal-product can be prevented.

BRIEF DESCRIPTION OF THE DRAWINGS

The object and advantages of the invention will become understood from the following detailed description of preferred embodiments thereof in connection with the accompanying drawings in which like numerals designate like elements, and in which.

DETAILED DESCRIPTION OF THE PREFERRED EMBODIMENTS

Example 1

Under the process conditions listed in the following table, the shot-peening process was carried out for the surface of the sliding portion of a uniform motion joint ball bearing as metal-product.

TABLE 1-1

Shot-Peening Process Conditions of Example 1

| | |
|---|---|
| Shot-Peening Apparatus | Powder Blast Apparatus |
| Metal-Product | Uniform Motion Joint Ball Bearing (External Diameter φ 20) |
| Metal-Product Material | SUJ (High Carbon Chrome Bearing Steel) |
| Ejection Pressure | 4.5 kg/cm$^2$ |
| Ejection Nozzle Diameter | 9 mm |
| Ejection Velocity | 120 m/sec |
| Ejection Distance | 200 mm |
| Process Time | 200 products/10 minutes |
| Shot Material | Alumina-Silica Bead |
| Shot Diameter | 40μ (#400) |
| Shot Hardness | About 1000 Hv (Moh's Hardness 7.5) |

The blast apparatus for micro powder in Example 1 was used for projecting abrasives in the form of micro powder at the surface of each metal-product in the shot-peening process. In the micro powders the abrasive particles have a particle size of 5 to 80μ. Then, if the micro powders accumulate so as to form a conical mountain shape, the micro powders do not fall to the foot of the mountain. In an extreme case, the adsorption force between the powders is so large that the angle with which the powders accumulate approaches a right angle. This differs from the case of abrasives having normal particle sizes. The blast apparatus for micro powder is constructed so that vibration and agitation are carried out for the micro powders contained in a tank by means of an air vibrator. Thus, an predetermined quantity of micro powder is uniformly supplied to an ejection nozzle. The apparatus has the almost same structure as that of the gravity blast apparatus shown in FIG. 5 which will be explained below.

Figure 5:
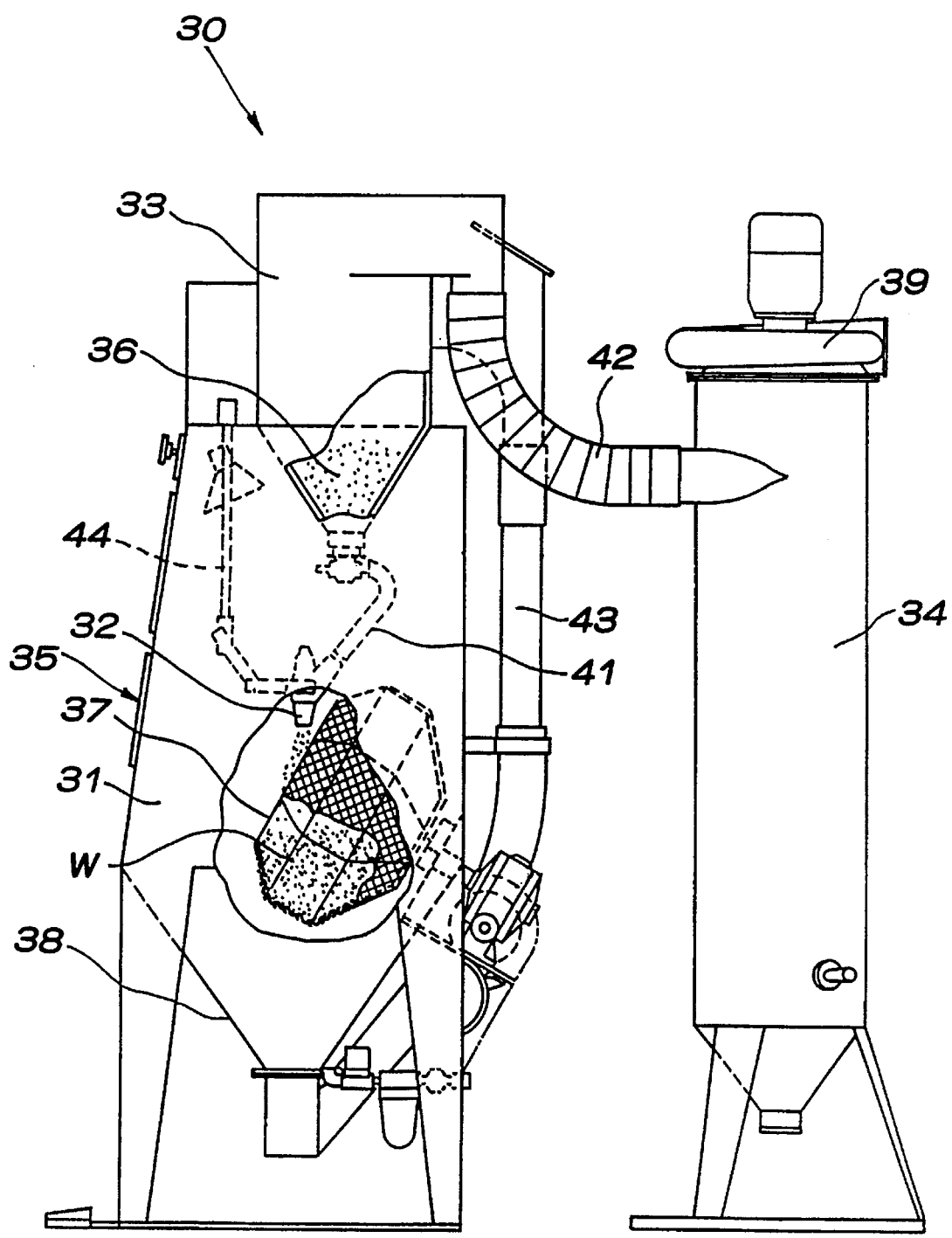
FIG. 5 is a view illustrating a gravity blast work apparatus used in examples of the present invention.

Now, an explanation of the gravity blast apparatus 30 shown in FIG. 5 will be substituted for an explanation of the blast apparatus for micro powder.

The gravity blast apparatus 30 is provided with a nozzle 32 for injecting abrasives 36 such as shots into a cabinet 31 equipped with a gate 35. Through the gate 35, the metal-products, W, which correspond to objects to be machine worked, are introduced and discharged. A pipe 44 connected to the nozzle 32 is communicated with a compressor (not shown) from which compressed air is supplied. A hopper 38 is provided at the lower portion of the cabinet 31. The lowest end of the hopper 38 communicates, through a conduit 43, with the upper side of a recovery tank 33 which is provided at the upper side of the cabinet 31. The lower end of the recovery tank 33 communicates, through a pipe 41, with nozzle 32. The abrasives contained in the recovery tank 33 fall therefrom, due to gravity or predetermined pressure, so as to be injected into the cabinet 31 together with the compressed air supplied through the above pipe 44 to the nozzle 32.

The shots 36 are introduced into the recovery tank 33. Each shot 36 is manufactured as a ceramic-silica bead having the size of 40μ and a hardness of about 1000 Hv (Moh's Hardness 7.5), which is higher than that of the metal of the uniform motion joint ball bearing, the object W to be machine-worked. Each shot 36 has the shape of an accurate sphere or almost accurate sphere. By forming each shot 36 in a shape close to an accurate sphere, the effect achieved by the process is enhanced.

Two hundred uniform motion joint ball bearing as the metal-products are introduced through gate 35 into a barrel 37 in the cabinet 31. While the barrel 37 is rotated at the rotation speed of 3 rotations/minute, the shots are projected at a pressure of 4.5 kg/cm$^2$, a velocity of 120 m/sec and from a distance of 200 mm at the uniform motion joint ball bearings reversal rotated in the barrel 37. This barrel 37 is a basket-shaped container having an octagonal cross section. The above nozzle 32 is secured in the cabinet so as to be directed toward the barrel 37.

The ejected shots 36 and dust, generated by the projection of these shots 36 at the uniform motion joint ball bearings, to fall in the hopper 38 provided at the lower portion of the cabinet 31. Then, the shots 36 and dusts are moved up, by an upward gas stream in the conduit 43, into the recovery tank where the shots 36 are recovered. By a gas stream in the recovery tank 33, dust in the recovery tank 33 are discharged from the upper end of the recovery tank 33, through a pipe 42, to a dust collector 34 where the dusts are collected at its bottom. Then, air from which the dusts are removed is discharged through a fan 39 provided at the upper portion of the dust collector 34.

Under the above conditions, a rise in temperature occurs neat the surface of the sliding portion of each uniform motion joint ball bearing. Thus, very small concave portions 52 (see FIGS. 1 and 2) having the circular-arc shaped cross sections are formed accurately on the surface of the sliding portion of each metal-product. Further, the structure of the surface layer of the sliding portion is minuted so as to have high internal stress, hardness and toughness.

In Example 1, the desirable result could be obtained as shown in Table 1-2 (Comparison Example 1; Comparison of Treated Product in Example 1 with Untreated Product) which will be discussed below. Now, the reason of this will be explained closely.

First, the rise in temperature occurring when the shots are projected at the surface of each metal-product will be explained.

The velocity of the shots before their collision is different from that after their collision. The difference depends on the hardness of the metal-product and that of the shot. At any rate, the velocity of the shots after their collision is decreased comparing that before their collision. According to the rule of energy conservation, most of energy produced by the decrease in velocity is converted into heat energy and the rest of it is converted to sound energy. The collision causes deformation at the portion impacted, thereby heat energy in the form of internal friction occurs at the impacted portion. Since heat conversion occurs at only the portion which is deformed by collision of the shots, a small area is heated to a high temperature.

In other words, local temperature increase occurs near the surface of each metal-product, although the weight of the portion which is deformed and heated by the collision of the shots is increased in proportion to the velocity of the shots before their collision, because the weight of the portion is very small against the whole weight of the metal-products.

In the collision of the shots having large surface hardness with the metal-products having also large surface hardness, the restitution coefficient e approaches one. Then, in this case, since the deformed portion is small, the local temperature increase is further noticeable.

The temperature increase is proportional to the velocity of the shots before the collision. Thus, the injection velocity of the shots must be increased in order to obtain the large temperature increase. Accordingly, the shot diameter is preferably determined to be short of 20 to 200µ. In such short diameter, the shots can be injected at the high injection velocity same as or larger than 50 m/sec. Moreover, the surface of each metal-product can be heated uniformly.

Due to the impact force of the shots, the temperature of the surface layer of the sliding portion of each metal-product is increased to be same as or higher than the $A_3$ transformation temperature of the base metal in the case that each metal-product is iron-carbon steel such as high carbon chrome bearing steel. Then, the metallic structure of the surface layer is softened so that the very small concave portions 52 having small circular-arc shaped cross sections are formed on the surface of the sliding portion due to the impact force of each shot having the shape of almost sphere. While these concave portions 52 having small circular-arc shaped cross sections are formed in this way, the structure of the surface layer of the sliding portion of each metal-product is minuted thereby the internal stress is increased so that the structure has have large hardness and toughness.

A metal-product which is not subjected to the above shot-peening process (expressed hereafter as "untreated product") is compared with a metal-product treated by the above shot-peening process (hereafter expressed as "treated product"). From this comparison, it is clear that the structure condition of the surface layer of the sliding portion of each treated product is minuted. The cross sectional shape of the surface layer of the sliding portion of each metal-product before the shot-peening process has V-shaped concave portions or very small grooves. However, such V-shaped concave portions or very small grooves are eliminated when the concave portions 52 having circular arc shaped cross sections are formed on the surface of the sliding portion of each treated product due to the above shot-peening process.

Figure 1:
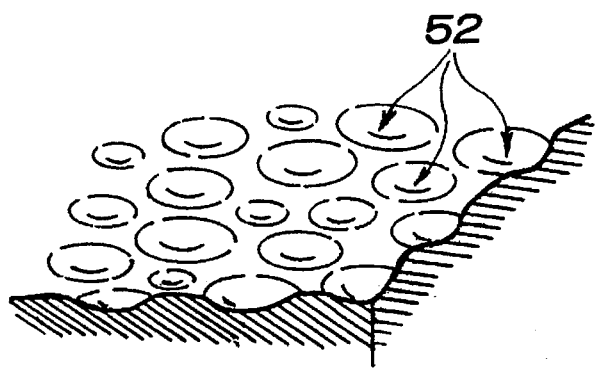
FIG. 1 is a perspective view schematically showing a surface of a metal-product on which a shot-peening process according to the present invention has been performed.
Figure 2:
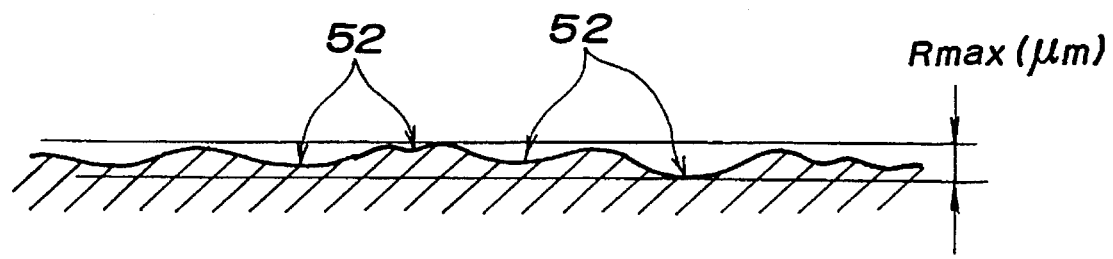
FIG. 2 is a cross sectional view schematically showing the surface of a metal-product in accordance with the present invention.

FIG. 1 is a perspective view schematically illustrating the surface condition of each treated product. Further, as shown in FIG. 2, schematic illustration of the surface condition of each treated product on the cross section indicates a smooth curve.

Figure 3:
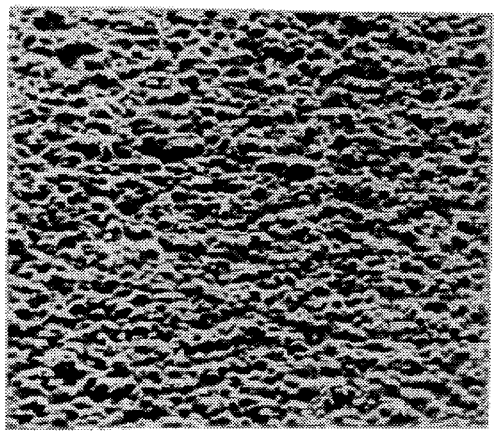
FIG. 3 is an enlarged view based on a microphotograph (×100) of the surface of an aluminium metal-product on which a shot-peening process according to the present invention has been performed.
Figure 4:
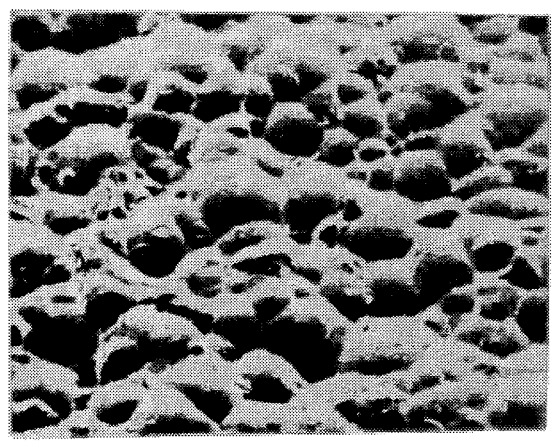
FIG. 4 is an enlarged view based on a microphotograph (×500) of the surface of the same metal-product as that of FIG. 3.

FIGS. 3 and 4 show microphotographs of the surface of an aluminum metal-product treated in Example 4 explained below. The surface condition of the iron-carbon steel metal-product treated in Example 1 is basically similar to the surface shown in FIGS. 3 and 4.

Therefore, when the lubricating oil is supplied to the surface of the sliding portion of the metal-products, oil droplets are formed from the lubricating oil on the surface of each concave portion 52 having the circular-arc shaped cross section. Since the the concave portions 52 having very small circular arc-shaped cross sections are each accurately formed on the surface of the sliding portion as shown in FIG. 1, adjacent oil droplets are connected with each other so that a stable oil film is formed on the whole surface of the sliding portion. Accordingly, even if the sliding portion of the metal-product is sliding and the bearing pressure is applied there, the surface tension of each oil droplet is maintained and the oil film is prevented from being broken in sliding for long time.

On the other hand, in the case that an untreated product is provided with, at its sliding portion, concave portions having V-shaped cross sections as stated above, the lubricating oil flows to these concave portions having V-shaped cross sections. Particularly, it is known that, since the concave portions having V-shaped cross sections are formed so as to have the indented pattern due to the cutting and grinding, when the bearing pressure is applied to the sliding portion, the lubricating oil flows along the grooves of the indented pattern of the concave portions having V-shaped cross sections. The lubricating oil thereby looses its surface tension and the oil film on the surface of the sliding portion is broken.

If there were pointed parts on the surface between the concave portions 52, the bearing pressure applied to the sliding portion of each metal-product would cause the oil film to break. However, as shown in FIG. 2, since the surface of the treated product has no pointed portions, the oil film is prevented from being broken.

The metallic structure of the surface layer of the sliding portion of each metal-product is minuted thereby the internal stress is increased so that the structure has high hardness and toughness. Therefore, in the metal-product, when the sliding portions are rubbed against each other while they are subjected to sliding for long time periods, frictional resistance at the sliding portions is decreased. Further, each concave portion 52 is not deformed. Therefore, even if the sliding is performed for long time, the oil film is stable and prevented from being broken. From the comparison of the untreated uniform motion joint ball bearing and treated uniform motion joint ball in this Example, it is clear that the shot-peening process is very effective. Table 1-2 presents the the comparison of untreated and treated products of Example 1.

TABLE 1-2

Comparison between Treated Products by the Example 1 and Untreated one

|  | Untreated Product | Treated Product |
| --- | --- | --- |
| Surface Roughness | 0.6 to 0.4 Rmax (µm) | 1.2 to 1.0 Rmax (µm) |
| Surface Hardness | 750 Hv | 1150 Hv |
| Surface Layer Internal Stress | 700 MPa | 1100 MPa |
| Abrasion Test (Time) hr (Result) | 150 hrs Abrasion (Peeling) | 400 hrs No Abrasion |

The abrasion test was carried out by loading untreated products and treated products, respectively, in an actual apparatus for rotation at a rotation speed of 3000 rpm. The lubricating oil was mission oil.

According to the result of the abrasion test shown in Table 1-2, in the case of the untreated product, peeling occurred at retainers of the inner and outer rings of each ball bearing after operation of 150 hrs, resulting in abnormal abrasion. In the case of the treated product, abrasion did not occur after operation of 400 hrs. In this comparison, the abrasion test was performed for only 400 hrs, because the effect of the shot-peening process of the present invention could be sufficiently proved within that time period.

The surface hardness of the treated product was about 1.5 times that of the untreated product and the surface internal stress of the treated product was about 1.5 times that of the untreated product. As explained before, this means that the structure of the surface layer at the sliding portion of the metal-product was minuted thereby the internal stress was increased and the hardness increased.

The roughness of the surface of the treated product was larger than that of the untreated product by a small amount.

This difference is not factor for improving the abrasion proof of the sliding portion of the metal-product. As explained before, the surface condition and metallic structure condition of the metal-product have large influence against the abrasion proof of the sliding portion. Since the roughness of the treated product was about 1.2 to 1.0 Rmax (μm), it was found that each concave portion formed on the surface of the sliding portion had a small depth of 1.2 μm or smaller.

As for the following Examples, conditions of the shot-peening processes and comparisons of metal-products (treated products) on which the above shot-peening processes is performed and metal-products (untreated products) on which the above shot-peening processes is not performed are shown in their respective tables.

Example 2

In Example 2, the shot-peening process was exchange performed on a speed reducer needle roller having a diameter of 4 mm and a length of 50 mm. The following tables show the, conditions of the shot-peening process and a comparison of a product treated under these conditions and an untreated product.

TABLE 2-1

Shot-Peening Process Conditions of Example 2

| | |
|---|---|
| Shot-Peening Apparatus | Powder Blast Apparatus |
| Metal-Product | Speed Reducer Needle Roller (φ4 × 50L) |
| Metal-Product Material | SUJ (High Carbon Chrome Bearing Steel) |
| Injection Pressure | 4.5 kg/cm² |
| Injection Nozzle Diameter | 9 mm |
| Injection Velocity | 110 m/sec |
| Injection Distance | 200 mm |
| Process Time | 400 products/15 minutes |
| Shot Material | Alumina-Silica Bead |
| Shot Diameter | About 60μ (#300) |
| Shot Hardness | About 1000 Hv (Moh's Hardness 7.5) |

TABLE 2-2

Comparison of Treated Product in Example 2 and Untreated Product

| | Untreated Product | Treated Product |
|---|---|---|
| Surface Roughness | 0.8 to 0.6 Rmax (μm) | 0.6 to 0.4 Rmax (μm) |
| Surface Hardness | 700 Hv | 1100 Hv |
| Surface Layer Internal Stress | 500 MPa | 1350 MPa |
| Abrasion Test (Time) hr (Result) | 200 hrs Abrasion (Peeling) | 400 hrs No Abrasion |

The abrasion test was carried out by loading untreated products and treated products, respectively, in an actual apparatus for rotation at a rotation speed of 3800 rpm. The lubricating oil was machine oil.

According to the result of the abrasion test, in the case of the untreated product peeling occurred at the surface of the sliding portion of the needle roller after operation of 250 hrs, resulting in abnormal abrasion. In the case of the treated product, abrasion did not occur after operation of 400 hrs. In this comparison, the abrasion test was performed for only 400 hrs.

Unlikely the case of Example 1, the surface roughness of the treated product was smaller than that of the untreated product. However, as shown in Table 2-2, the surface hardness and the surface internal stress of the treated product were far higher than those of the untreated product. This means that the difference of the surface roughness is not a factor for improving abrasion resistance of the sliding portion of the metal-product. On the other hand, the surface condition and metallic structure condition of the metal-product have a large influence on improvement of the abrasion resistance of the metal-product. Since the roughness of the treated product was about 0.6 to 0.4 Rmax (μm) it was found that each concave portion formed on the surface of the sliding portion had a small depth of 0.6 μm or smaller.

Example 3

In Example 3, the shot-peening process was performed in two steps. Both the first step and the second step were performed on a machine tool spline shaft having a diameter of 50 mm and a length of 600 mm. The following tables show the conditions of the shot-peening process steps as well as a comparison of a product treated under these conditions and an untreated product.

TABLE 3-1

Shot-peening Process Conditions of the First Steps in Example 3

| | |
|---|---|
| Shot-Peening Apparatus | Straight Hydraulic Blast Apparatus |
| Metal-Product | Machine Tool Spline Shaft (φ50 × 600L) |
| Metal-Product Material | SCM (Chrome Molybdenum Steel) |
| Injection Pressure | 5 kg/cm² |
| Injection Nozzle Diameter | 5 mm |
| Injection Velocity | 200 m/sec |
| Injection Distance | 200 mm |
| Injection Time | 3 min/1 direction × 3 directions |
| Process Time | 1 product/9 minutes |
| Shot Material | Steal Bead |
| Shot Diameter | About 60μ (#300) |
| Shot Hardness | 800 Hv |

TABLE 3-2

Shot-Peening Process Conditions of the Second Steps in Example 3

| | |
|---|---|
| Shot-Peening Apparatus | Gravity Blast Apparatus |
| Injection Pressure | 5.5 kg/cm² |
| Injection Nozzle Diameter | 9 mm |
| Injection Velocity | 150 m/sec |
| Injection Distance | 150 mm |
| Injection Time | 2 min/1 direction × 3 directions |
| Process Time | 1 product/6 minutes |
| Shot Material | Alumina-Silica Bead |
| Shot Diameter | About 60μ (#300) |
| Shot Hardness | About 1000 Hv (Moh's Hardness 7.5) |

TABLE 3-3

Comparison of Treated Product in Example 3 and Untreated Product

| | Untreated Product | Treated Product |
|---|---|---|
| Surface Roughness | 4.0 to 2.0 Rmax (μm) | 3.0 to 2.0 Rmax (μm) |
| Surface Hardness | 700 Hv | 1400 Hv |
| Surface Layer Internal Stress | 500 MPa | 1350 MPa |
| Abrasion Test (Time) hr (Result) | 200 hrs Abnormal Abrasion | 400 hrs No Abrasion |

The abrasion test was carried out by loading untreated products and treated products, respectively, in an actual apparatus for reciprocating movement at a velocity of 600 m/sec. The lubricating oil was machine oil.

According to the results of the abrasion test, in the case of the untreated product abnormal abrasion occurred at the surface of the spline portion of the spline shaft after operation of 200 hrs. In the case of the treated product, abrasion did not occur after operation of 400 hrs. In this comparison, the abrasion test was performed for only 400 hrs.

The surface hardness of the treated product was about 2 times that of the untreated product and the surface internal stress of the treated product was about 2.7 times that of the untreated product. This means that, as stated before, the structure of the surface layer of the sliding portion of the metal-product was minuted and thereby the internal stress and hardness were increased.

The roughness of the surface was larger than in Examples 1 and 2. Since the roughness of the treated product was about 3.0 to 2.0 Rmax (μm), it was found that each concave portion formed on the surface of the sliding portion had a small depth of 3.0 μm or smaller.

Example 4

In Example 4, the shot-peening process was performed on a cam groove. The following tables show the conditions of the shot-peening process and a comparison of a treated product and an untreated product.

TABLE 4-1

| Shot-Peening Process Conditions of Example 4 | |
| --- | --- |
| Shot-Peening Apparatus | Powder Blast Apparatus |
| Metal-Product | Air Conditioner Aluminum Part (Cam Groove) (10 × 5 × 200 L mm) |
| Metal-Product Material | Aluminum |
| Injection Pressure | 3.0 kg/cm$^2$ |
| Injection Nozzle Diameter | 9 mm |
| Injection Velocity | 80 m/sec |
| Injection Distance | 200 mm |
| Process Time | 1 product/1 minute |
| Shot Material | Glass Bead |
| Shot Diameter | 40μ (#400) |
| Shot Hardness | About 700 Hv (Moh's Hardness 6) |

TABLE 4-2

| Comparison of Treated Product in Example 4 and Untreated Product | | |
| --- | --- | --- |
| | Untreated Product | Treated Product |
| Surface Roughness | 0.8 to 0.6 Rmax (μm) | 1.6 to 0.8 Rmax (μm) |
| Surface Hardness | 170 Hv | 300 Hv |
| Surface Layer Internal Stress | — | — |
| Abrasion Test (Time) hr (Result) | 100 hrs Abnormal Abrasion | 200 hrs No Abrasion |

Unlikely Examples 1, 2 and 3, the material of the metal-product of Example 4 is aluminum, not iron-carbon steel. However, in the results in Example 4 show the large effect the process of the present invention has on the metal-product.

As stated in Example 1, due to the impact force of the injected shots, the temperature of the surface layer of the sliding portion of the metal-product increased to the same as or higher than the recrystallization temperature of aluminum. Accordingly, as shown in FIGS. 3 and 4, the metallic structure of the surface layer was softened so that concave portions having small circular-arc shaped cross sections were formed due to the impact of the shots each having almost spherical shape. In FIGS. 3 and 4, black colored portions designate the concave portions.

Further, due to the impact force of the shots, the structure of the surface layer of the sliding portion of the metal-product was minuted so that the treated product has high surface hardness in comparison with the untreated product.

According to the results of the abrasion test, in the case of the untreated product abnormal abrasion occurred at the surface of the cam groove of the air conditioner aluminum part after operation of 100 hrs. In the case of the treated product, abrasion did not occur after operation for 200 hrs. In this comparison, the abrasion test was performed for only 200 hrs.

Since the roughness of the surface of the treated product was about 1.6 to 0.8 Rmax (μm), it was found that each concave portion formed on the surface of the sliding portion had a small depth of 1.6 μm or smaller.

Example 5

In Example 5, the shot-peening process was performed on an armature (electro-magnetic part) of a solenoid having a diameter of 15 mm. The following tables show the conditions of the shot-peening process and a comparison of a treated product and an untreated product.

TABLE 5-1

| Shot-Peening Process Conditions of Example 5 | |
| --- | --- |
| Shot-Peening Apparatus | Gravity Blast Apparatus |
| Metal-Product | Armature of Solenoid (φ 15) |
| Metal-Product Material | Stainless Steel |
| Injection Pressure | 3.0 kg/cm$^2$ |
| Injection Nozzle Diameter | 9 mm |
| Injection Velocity | 80 m/sec |
| Injection Distance | 150 mm |
| Process Time | 1 product/10 secs |
| Shot Material | Glass Bead |
| Shot Diameter | 125μ (#180) |
| Shot Hardness | About 700 Hv (Moh's Hardness 6) |

TABLE 5-2

| Comparison of Treated Product in Example 5 and Untreated Product | | |
| --- | --- | --- |
| | Untreated Product | Treated Product |
| Surface Roughness | 0.6 to 0.4 Rmax (μm) | 0.8 to 0.6 Rmax (μm) |
| Surface Hardness | 350 Hv | 450 Hv |
| Surface Layer Internal Stress | — | 400 MPa |
| Abrasion Test (Number) (Result) | 100,000 Times Abnormal Abrasion | 100,000 Times No Abrasion |

The abrasion test was carried out by contacting the untreated product and treated product for 0.5 seconds per contact, respectively. The lubricating oil was one available in the market ("CRC 5-56": trade name manufactured by CRC Chemicals Inc.).

According to the results of the abrasion test, for the untreated product abnormal abrasion occurred after 100,000 tests. In the case of the treated product, abrasion did not occur after 100,000 tests. The treated product could be available after 1,000,000 abrasion tests.

The surface hardness of the treated product was about 1.3 times that of the untreated product. This means that, as stated before, the structure of the surface layer of the sliding portion of the treated metal-product was minuted thereby increasing the internal stress and hardness.

Since the roughness of the treated product was about 0.8 to 0.6 Rmax (μm), it was found that each concave portion formed on the surface of the sliding portion had a small depth of 0.8 μm or smaller.

Example 6

In Example 6, the shot-peening process was performed in two steps. Both the first step and the second step were performed on a machine tool shaft metal bearing having a diameter of 50 mm and a length of 50 mm. The following tables show the conditions of the shot-peening process steps as well as a comparison of a product treated under these conditions and an untreated product.

TABLE 6-1

Shot-Peening Process Conditions of the First Steps in Example 6

| | |
|---|---|
| Shot-Peening Apparatus | Powder Blast Apparatus |
| Metal-Product Machine | Tool Shaft Metal Bearing (φ50 × 50L) |
| Metal-Product Material | Melting Injection Super Hard Material |
| Injection Pressure | 4.0 kg/cm² |
| Injection Nozzle Diameter | 9 mm |
| Injection Velocity | 120 m/sec |
| Injection Distance | 200 mm |
| Process Time | 1 product/30 secs |
| Shot Material | WA |
| Shot Diameter | 28μ (#600) |
| Shot Hardness | About 2000 Hv |

TABLE 6-2

Shot-Peening Process Conditions of the Second Steps in Example 6

| | |
|---|---|
| Shot-Peening Apparatus | Powder Blast Apparatus |
| Injection Pressure | 5.0 kg/cm² |
| Injection Nozzle Diameter | 9 mm |
| Injection Velocity | 160 m/sec |
| Injection Distance | 150 mm |
| Process Time | 1 product/40 secs |
| Shot Material | Alumina-Silica Bead |
| Shot Diameter | 40μ (#400) |
| Shot Hardness | About 1000 Hv (Moh's Hardness 7.5) |

Although the metal-product was super hard material, the hardness of the product could be increased by using the WA (Whilte Alundum) as the shots for the shot-peening process in the first step. But the surface condition of the metal-product had a pattern with acute angles, so each valley portion of this pattern had a V-shaped cross section. Accordingly, in the second step, by using the alumina-silica beads as the shots for the shot-peening process, concave portions, each having a circular-arc shaped cross section, were formed. Hence, the surface can be formed to be smooth and have a high hardness.

TABLE 6-3

Comparison of Treated Product in Example 6 and Untreated Product

| | Untreated Product | Treated Product |
|---|---|---|
| Surface Roughness | 0.5 to 0.3 Rmax (μm) | 0.8 to 0.6 Rmax (μm) |
| Surface Hardness | 1300 Hv | 1500 Hv |
| Surface Layer | — | — |

TABLE 6-3-continued

Comparison of Treated Product in Example 6 and Untreated Product

| | Untreated Product | Treated Product |
|---|---|---|
| Internal Stress Abrasion Test (Time) hr (Result) | 10,000 hrs Abnormal Abrasion | 100,000 hrs No Abrasion |

The abrasion test was carried out by loading untreated product and treated product, respectively, in an actual apparatus for rotation at a rotation velocity of 5000 rpm. The lubricating oil was machine oil.

According to the results of the abrasion test, in the case of the untreated product abnormal abrasion occurred at the surface of the shaft metal bearing after operation of 10,000 hrs. In the case of the treated product, abrasion did not occur after operation of 100,000 hrs. In this comparison, the abrasion test was performed for only 100,000 hrs.

Since the roughness of the treated product was about 0.8 to 0.6 Rmax (μm), it was found that each concave portion formed on the surface of the sliding portion had a small depth of 0.8 μm or smaller.

Example 7

In Example 7, the shot-peening process was performed in two steps. Both the first and second steps were performed on an engine gear having a diameter of 100 mm and a length of 30 mm. The following tables show the conditions of blast work processes and a comparison of a treated product and an untreated product.

TABLE 7-1

Shot-Peening Process Conditions of the First Steps in Example 6

| | |
|---|---|
| Shot-Peening Apparatus | Straight Hydraulic Blast Apparatus |
| Metal-Product | Engine Gear (φ100 × 30L) |
| Metal-Product Material | SNCM (Nickel Chrome Molybdenum Steel) |
| Injection Pressure | 5.0 kg/cm² |
| Injection Nozzle Diameter | 5 mm |
| Injection Velocity | 200 m/sec |
| Injection Distance | 200 mm |
| Process Time | 1 product/60 secs, three directions |
| Shot Material | Steal Bead |
| Shot Diameter | About 60μ (#300) |
| Shot Hardness | 800 Hv |

TABLE 7-2

Shot-Peening Process Conditions of the Second Steps in Example 7

| | |
|---|---|
| Shot-Peening Apparatus | Powder Blast Apparatus |
| Injection Pressure | 5.0 kg/cm² |
| Injection Nozzle Diameter | 9 mm |
| Injection Velocity | 140 m/sec |
| Injection Distance | 150 mm |
| Process Time | 1 product/45 secs, 3 directions |
| Shot Material | Alumina-Silica Bead |
| Shot Diameter | About 60μ (#300) |
| Shot Hardness | About 1000 Hv (Moh's Hardness 7.5) |

TABLE 7-3

Comparison of Treated Product in Example 7 and Untreated Product

|  | Untreated Product | Treated Product |
| --- | --- | --- |
| Surface Roughness | 4.0 to 3.0 Rmax (μm) | 3.0 to 2.0 Rmax (μm) |
| Surface Hardness | 750 Hv | 1200 Hv |
| Surface Layer Internal Stress | 700 MPa | 1500 MPa |
| Abrasion Test (Time) hr (Result) | 20 hrs Abrasion (peeling) | 200 hrs No Abrasion |

The abrasion test was carried out by loading untreated product and treated product, respectively, in an actual apparatus for rotation at a rotation velocity of 6000 rpm. The lubricating oil was mission oil.

According to the results of the abrasion test, in the case of the untreated product pitching occurred on the surface of the engine gear and the surface was abraded. In the case of the treated product, pitching did not occur and there was no abrasion after operation of 200 hrs. In this comparison, the abrasion test was performed for only 200 hrs.

The surface hardness of the treated product was about 1.6 times that of the untreated product and the surface internal stress of the treated product was about 2.1 times that of the untreated product. This means that, as stated before, the structure of the surface layer of the sliding portion of the metal-product was minuted thereby increasing the internal stress and hardness.

Since the roughness of the treated product was about 0.8 to 0.6 Rmax (μm), it was found that each concave portion formed on the surface of the sliding portion had a small depth of 0.8 μm or smaller.

The treated products, i.e., treated engine gears, of this Example were inter-engaged and rotated at a rotation speed of 5000 to 8000 rpm. The temperature of the gear just after the start of rotation was about 100° C. In this situation, the gears are rotated for about 1 hour. The temperature of the supplied lubricating oil for forming an oil film on the surface of each gear was decreased so that the rotation noise of the gears was decreased.

Alternatively, after a heat process such as carburization was performed on the surface of the engine gear, the shot-peening process was performed under the same conditions as those of Example 7. Thus, the treated product obtained from this modified example was similar to that of Example 7. Precisely, after about one hour of rotating the engine gear treated in this modified example, the temperature of the oil decreased and the rotation noise decreased.

As is known from the above explanation in Example 7, the structure of the surface layer of the gear was minuted to have high surface hardness and toughness by the shot-peening process in the present invention. Accordingly, the when inter-engaging gears were fitted into each other, it resulted in smooth inter-engagement and small frictional resistance. Hence, the rotation noise of the gears decreased and the temperature of the oil decreased. Further, since the surface hardness of the gear was high, even if the gears inter-engaged for a long time, each concave portion formed on each gear's surface could keep its own shape. Accordingly, the surface tension of the oil film was maintained and did not decrease. The oil film could keep its condition so as to be stable. Finally, as shown in Table 7-3, the preferable results could be obtained from the abrasion test.

Example 8

In Example 8, the shot-peening process was performed on a crank shaft having a diameter of 50 mm and a length of 20 mm. The following tables show the conditions of the shot-peening process as well as a comparison of a product treated in accordance with Example 8 and an untreated product.

TABLE 8-1

Shot-Peening Process Conditions of Example 8

| Shot-Peening Apparatus | Powder Blast Apparatus |
| --- | --- |
| Metal-Product | Crank Shaft (φ50 × 20L) |
| Metal-Product Material | Copper Alloy |
| Injection Pressure | 3.0 kg/cm$^2$ |
| Injection Nozzle Diameter | 9 mm |
| Injection Velocity | 100 m/sec |
| Injection Distance | 200 mm |
| Process Time | 1 product/20 secs |
| Shot Material | Glass Bead |
| Shot Diameter | 40μ (#400) |
| Shot Hardness | About 700 Hv (Moh's Hardness 6) |

TABLE 8-2

Comparison of Treated Product in Example 8 and Untreated Product

|  | Untreated Product | Treated Product |
| --- | --- | --- |
| Surface Roughness | 0.4 to 0.2 Rmax (μm) | 0.6 to 0.4 Rmax (μm) |
| Surface Hardness | 160 Hv | 300 Hv |
| Surface Layer Internal Stress | — | — |
| Abrasion Test (Time) hr (Result) | 200 hrs Abnormal Abrasion | 400 hrs No Abrasion |

The material of the metal-product in Example 8 is copper alloy, a nonferrous metal. In the same way as in Example 4, where the metal-product is aluminum, due to the impact force caused by the collision of the shots, the temperature of the surface layer of the sliding portion of the metal-product is increased to the recrystallization temperature of the copper or higher, copper being the main metal. Thus, the structure of the surface layer is softened so that very small concave portions having circular-arc shaped cross sections are formed by the collision of the shots with almost spherical shape. Further, due to the impact force caused by the collision of the shots, the structure of the surface layer of the sliding portion of the metal-product of copper alloy is minuted so that the treated product can have high surface hardness.

The abrasion test was carried out by loading untreated product and treated product, respectively, in an actual apparatus for rotation at a rotation velocity of 6000 rpm. The lubricating oil was engine oil.

According to the results of the abrasion test, in the case of the untreated product abnormal abrasion occurred at the surface of the sliding portion of the crank shaft after operation of 200 hrs. In the case of the treated product, abrasion did not occur after operation of 400 hrs. In this comparison, the abrasion test was performed for only 400 hrs.

The surface hardness of the treated product was about 1.9 times that of the untreated product. This means that, as stated before, the structure of the surface layer of the sliding portion of the metal-product was minuted thereby increasing the hardness.

Since the roughness of the treated product was about 0.6 to 0.4 Rmax (μm), it was found that each concave portion formed on the surface of the sliding portion had a small depth of 0.6 µm or smaller.

Example 9

In Example 9, the shot-peening process was performed on motorcycle engine (250 cc) parts (Example 9-1 to 9-5).

The following tables show the conditions of the shot-peening process as well as a comparison of treated products of Example 9 and untreated products as for motorcycle engine parts.

TABLE 9-1-1

Shot-Peening Process Conditions of Example 9-1

| | |
|---|---|
| Shot-Peening Apparatus | Gravity Blast Apparatus |
| Metal-Product | Crank Shaft |
| Metal-Product Material | FCD (Spherical Graphite Cast Iron) Carburized Product |
| Injection Pressure | 4.0 kg/cm$^2$ |
| Injection Nozzle Diameter | 9 mm |
| Injection Velocity | 130 m/sec |
| Injection Distance | 200 mm |
| Process Time | 1 product/80 secs |
| Shot Material | Alumina-Silica Bead |
| Shot Diameter | About 60µ (#300) |
| Shot Hardness | About 1000 Hv (Moh's Hardness 7.5) |

TABLE 9-1-2

Shot-Peening Process Conditions of Example 9-2

| | |
|---|---|
| Shot-Peening Apparatus | Powder Blast Apparatus |
| Metal-Product | Piston |
| Metal-Product Material | Aluminum Alloy |
| Injection Pressure | 3.0 kg/cm$^2$ |
| Injection Nozzle Diameter | 9 mm |
| Injection Velocity | 100 m/sec |
| Injection Distance | 200 mm |
| Process Time | 1 product/60 secs |
| Shot Material | Alumina-Silica Bead |
| Shot Diameter | About 40µ (#400) |
| Shot Hardness | About 1000 Hv (Moh's Hardness 7.5) |

TABLE 9-1-3

Shot-Peening Process Conditions of Example 9-3

| | |
|---|---|
| Shot-Peening Apparatus | Gravity Blast Apparatus |
| Metal-Product | Con'rod |
| Metal-Product Material | SCM (Chrome Molybdenum Steel) |
| Injection Pressure | 3.0 kg/cm$^2$ |
| Injection Nozzle Diameter | 9 mm |
| Injection Velocity | 100 m/sec |
| Injection Distance | 150 mm |
| Process Time | 1 product/30 secs |
| Shot Material | Alumina-Silica Bead |
| Shot Diameter | About 60µ (#300) |
| Shot Hardness | About 1000 Hv (Moh's Hardness 7.5) |

TABLE 9-1-4

Shot-Peening Process Conditions of Example 9-4

| | |
|---|---|
| Shot-Peening Apparatus | Gravity Blast Apparatus |
| Metal-Product | Cylinder |
| Metal-Product Material | FCD (Spherical Graphite Cast Iron) |
| Injection Pressure | 4.0 kg/cm$^2$ |
| Injection Nozzle Diameter | 9 mm |
| Injection Velocity | 130 m/sec |
| Injection Distance | 200 mm |
| Process Time | 1 product/60 secs |
| Shot Material | Alumina-Silica Bead |

TABLE 9-1-4-continued

Shot-Peening Process Conditions of Example 9-4

| | |
|---|---|
| Shot Diameter | About 60µ (#300) |
| Shot Hardness | About 1000 Hv (Moh's Hardness 7.5) |

TABLE 9-1-5

Shot-Peening Process Conditions of Example 9-5

| | |
|---|---|
| Shot-Peening Apparatus | Gravity Blast Apparatus |
| Metal-Product | Gear |
| Metal-Product Material | SCM (Chrome Molybdenum Steel) Carburized Product |
| Injection Pressure | 6.0 kg/cm$^2$ |
| Injection Nozzle Diameter | 9 mm |
| Injection Velocity | 150 m/sec |
| Injection Distance | 150 mm |
| Process Time | 1 product/60 secs |
| Shot Material | High-Speed Bead |
| Shot Diameter | About 40µ (#400) |
| Shot Hardness | About 1000 to 1300 Hv |

TABLE 9-2-1

Example 9-1
Comparison of Treated Product of Example 9-1 and Untreated Product (Crank Shaft)

| | Untreated Product | Treated Product |
|---|---|---|
| Surface Roughness | 2.0 Rmax (µm) | 1.5 Rmax (µm) |
| Surface Hardness | 700 Hv | 1000 Hv |
| Surface Layer Internal Stress | 500 MPa | 800 MPa |
| Abrasion Test (Time) hr | 200 hrs | 400 hrs |
| (Result) | Abnormal Abrasion | No Abrasion |

TABLE 9-2-2

Example 9-2
Comparison of Treated Product of Example 9-2 and Untreated Product (Piston)

| | Untreated Product | Treated Product |
|---|---|---|
| Surface Roughness | 3.0 to 5.0 Rmax (µm) | 3.0 to 2.0 Rmax (µm) |
| Surface Hardness | 300 Hv | 450 Hv |
| Surface Layer Internal Stress | — | — |
| Abrasion Test (Time) hr | 200 hrs | 400 hrs |
| (Result) | Abnormal Abrasion | No Abrasion |

TABLE 9-2-3

Example 9-3
Comparison of Treated Product of Example 9-3 and Untreated Product (Con'rod)

| | Untreated Product | Treated Product |
|---|---|---|
| Surface Roughness | 3.0 Rmax (µm) | 2.0 Rmax (µm) |
| Surface Hardness | 750 Hv | 1100 Hv |
| Surface Layer Internal Stress | — | — |
| Abrasion Test (Time) hr | 200 hrs | 400 hrs |
| (Result) | Damage | No Damage |

TABLE 9-2-4

Example 9-4
Comparison of Treated Product of Example 9-4 and Untreated Product (Cylinder)

|  | Untreated Product | Treated Product |
| --- | --- | --- |
| Surface Roughness | 3.0 Rmax (μm) | 2.0 Rmax (μm) |
| Surface Hardness | 450 Hv | 550 Hv |
| Surface Layer Internal Stress | — | — |
| Abrasion Test (Time) hr (Result) | 200 hrs Wound | 400 hrs No Wound |

TABLE 9-2-5

Example 9-5
Comparison of Treated Product of Example 9-5 and Untreated Product (Gear)

|  | Untreated Product | Treated Product |
| --- | --- | --- |
| Surface Roughness | 3.0 Rmax (μm) | 1.5 Rmax (μm) |
| Surface Hardness | 750 Hv | 1100 Hv |
| Surface Layer Internal Stress | 600 MPa | 1300 MPa |
| Abrasion Test (Time) hr (Result) | 200 hrs Abnormal Abrasion | 400 hrs No Abrasion |

Each abrasion test was carried out by loading untreated product and treated product, respectively, in an actual apparatus for rotation at a rotation velocity of 10,000 rpm. The lubricating oil was mission oil for the gear and engine oil for other metal-products.

According to the results of the abrasion tests, in the case of each untreated product of the above parts abnormal abrasion occurred at the whole surface of its sliding portion after operation for 200 hrs. In the case of each treated product, abrasion did not occur after operation for 400 hrs. In these comparisons, the abrasion test was performed for only 400 hrs.

The surface hardness of each treated product was higher than that of the untreated product and the internal stress of the surface layer of each treated product was also higher than that of the untreated product. As stated before, this means that the structure of the surface layer of the metal-product was minuted by means of the shot-peening process so that hardness increased. Further, it was confirmed that the surface roughness of the treated product was larger than that of the untreated product.

When the engine provided with treated products of Example 9 was rotated at 10,000 rpm, the engine noise was decreased and the temperature of the mission oil was lower by 10° C. in comparison to that of an engine provided with the untreated products.

It is known from the above explanation that, by means of the shot-peening process under the conditions of Example 9, the noise from the general engine decreased. Further, the maximum rotation number of the engine provided with the untreated products was 16,000 rpm, while that of the engine provided with the treated products was 17,800 rpm. Precisely, the durability of the former engine was 1.125 times that of the latter engine.

As explained above, by means of the shot-peening process, on the surface of the sliding portion of the metal-product, the oil sumps are formed consisting of very small concave portions each having a small circular-arc shaped cross section. Accordingly, by supplying the lubricating oil to the surface of the sliding portion of the metal-product, the lubricating oil forms, due to its surface tension, oil droplets, each droplet being contained in a concave portion having an arc-circular cross section. As a result, a stable oil film is formed on the whole surface of the sliding portion. Further, when the bearing pressure is applied to the sliding portion of the metal-product, each oil droplet in each concave portion maintains its surface tension and the oil film is prevented from being broken during sliding for long time periods. Thus, a method for efficiently preventing abrasion on the surface of the sliding portion of a metal-product can be obtained.

The metallic structure of the surface layer of the sliding portion of the metal-product is changed, by means of the shot-peening process. The structure is minuted and has high internal stress, hardness and toughness. Accordingly, even if the sliding portion is subjected to sliding for long time periods, each concave portion maintains its shape so as not to be changed.

Accordingly, the oil film formed is stable and prevented from being broken. Therefore, a method for preventing abrasion of the surface of the sliding portion of a metal-product can be obtained. Since the friction coefficient of the surface of the sliding portion of the metal-product can be decreased, frictional heat generated at the sliding portion is inhibited. The temperature is lowered and thus thermal expansion does not occur in the sliding portion. Hence, it is not necessary to consider the thermal expansion in the preparation of designing the dimension of the metal-product, resulting in high dimension-accuracy of the metal-product. Thus, the sliding velocity such as the velocity of the rotation at the sliding portion of the metal-product can be increased. This satisfies recently enlarging requirements for increasing velocity, rotation velocity and loading in the field of metal-products. Further, at the sliding portion of the metal-product, its surface can slide smoothly, thereby, decreasing vibration noise or other noise caused from this sliding. That is to say, the durability of the apparatus provided with the metal-product is very long, and consideration for the environmental problem of noise is carried out sufficiently in operation with the apparatus.

When high pressure is applied repeatedly to a certain portion, this portion is damaged due to local fatigue, which is a pitching phenomenon. Since the sliding portion of the metal-product has high hardness and toughness, such pitching phenomenon can be prevented.

Thus, the broadest claims that follow are not directed to a machine that is configure in a specific way. Instead, the broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained. Also, since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for preventing abrasion of a metal-product, made of ferrous metal having an $A_3$ transformation temperature or made of nonferrous metal having a recrystallization temperature, said metal-product having a portion which is to be subjected to sliding action, said portion having a surface, said method comprising:

subjecting said portion of said metal-product to shot peening thereby resulting in an increase in temperature at the surface of said portion of said metal-product to a temperature at least as high as (a) $A_3$, the transformation temperature of the metal of said metal product in the case that said metal-product is made of a ferrous metal, or (b) the recrystallization temperature of said metal of said metal product in the case that said metal-product is made of a nonferrous metal, and formation of a plurality of concave sumps on said surface of said portion, each sump having a circular arc-shaped cross section, said shot-peening comprising projecting shots under pressure at a velocity of at least 50 m/sec whereby said shots impact against said surface of said portion, said shots having a hardness at least as high as that of said metal-product, a substantially spherical shape, and a size of 20 to 200μ.

2. A method for preventing abrasion according to claim 1, further comprising subjecting said surface of said portion of said metal-product to at least one more further shot-peening.

3. A method for preventing abrasion according to claim 2, wherein, in said further shot-peening, shots are expelled at a pressure at least as high as the pressure of the prior shot-peening.

4. A method according to claim 2, wherein said further shot-peening is performed using alumina-silica beads as said shots.

5. A method for preventing abrasion according to claim 1, further comprising supplying lubricating oil to said surface of said portion of said metal-product so that an oil film is formed on said surface.

6. A metal product produced according to the method of claim 5.

7. A method for preventing abrasion according to claim 1, wherein said shots are spherical.

8. A method for preventing abrasion according to claim 1, wherein said shots are expelled at a velocity of 100 to 200 m/sec.

9. A method for preventing abrasion according to claim 1, wherein said size of said shots is 28 to 125μ.

10. A method for preventing abrasion according to claim 1, wherein said shots are expelled from a nozzle having an internal diameter of 5 to 9 mm.

11. A method for preventing abrasion according to claim 10, wherein the distance from said nozzle to said surface of said portion is 150–200 mm.

12. A method for preventing abrasion according to claim 10, wherein said shots are expelled at a pressure of 3 to 6 kg/cm².

13. A method for preventing abrasion according to claim 11, wherein after said shot-peening, a further shot-peening is performed wherein shots are expelled from a nozzle and the distance from said nozzle to said surface is at least as large as the distance in the prior shot-peening.

14. A method for preventing abrasion according to claim 11, wherein said shots are expelled at a velocity of 100 to 200 m/sec.

15. A method for preventing abrasion according to claim 14, wherein said size of said shots is 28 to 125μ.

16. A method for preventing abrasion according to claim 1, wherein said shots are manufactured from metal, ceramic or glass.

17. A method according to claim 1, wherein each concave sump has a substantially circular top perimeter of 0.1 to 5μ in size.

18. A method according to claim 1, wherein said said surface of said portion has a roughness higher than that of said surface before said shot-peening.

19. A method according to claim 18, wherein, after said shot-peening, said surface has a roughness at least as high as 0.1μ.

20. A metal product produced according to the method of claim 1.

21. A method according to claim 1, wherein said shots exhibit a hardness of at least 700 Hv.

22. A method according to claim 1, wherein the hardness of said surface after said shot-peening is greater than the hardness of said surface before said shot-peening.

23. A method for increasing the abrasion resistance of a surface of a metal product, said method comprising:

subjecting said surface to shot-peening whereby the temperature of said surface is increased and the surface is softened, said shot-peening resulting in formation of a plurality of concave structures having circular arc-shaped cross sections on said surface and also resulting in an increase in internal stress, wherein, in said shot-peening, substantially spherical shots having a size of 20–200μ are impacted against said surface at a velocity of at least 50 m/s.

24. A method according to claim 23, wherein said metal product is made of ferrous metal and, during said shot-peening, the temperature of said surface is increased to at least the $A_3$ transformation temperature of said ferrous metal.

25. A method according to claim 23, wherein said metal product is made of nonferrous metal and, during said shot-peening, the temperature of said surface is increased to at least the recrystallization temperature of said nonferrous metal.

26. A method according to claim 1, wherein, prior to said shot-peening, said surface is provided with concave portions having V-shaped cross sections.

* * * * *